US010533602B2

(12) United States Patent
Fuchs (10) Patent No.: US 10,533,602 B2
(45) Date of Patent: Jan. 14, 2020

(54) HYDRODYNAMIC PLAIN BEARING

(71) Applicant: VOITH PATENT GMBH, Heidenheim (DE)

(72) Inventor: Andreas Fuchs, Pfronten-Ried (DE)

(73) Assignee: Voith Patent GmbH, Heidenheim (DE)

( * ) Notice: Subject to any disclaimer, the term of this patent is extended or adjusted under 35 U.S.C. 154(b) by 21 days.

(21) Appl. No.: 15/112,076

(22) PCT Filed: Jan. 13, 2015

(86) PCT No.: PCT/EP2015/050496
§ 371 (c)(1),
(2) Date: Jul. 15, 2016

(87) PCT Pub. No.: WO2015/107046
PCT Pub. Date: Jul. 23, 2015

(65) Prior Publication Data
US 2016/0333925 A1    Nov. 17, 2016

(30) Foreign Application Priority Data

Jan. 15, 2014  (DE) .......... 10 2014 200 593
Sep. 10, 2014  (DE) .......... 10 2014 218 107

(51) Int. Cl.
*F16C 17/02*    (2006.01)
*F16C 37/00*    (2006.01)
(Continued)

(52) U.S. Cl.
CPC .......... *F16C 17/028* (2013.01); *F16C 17/022* (2013.01); *F16C 33/1075* (2013.01);
(Continued)

(58) Field of Classification Search
CPC .. F16C 17/022; F16C 17/028; F16C 32/0651; F16C 32/0655; F16C 32/0659;
(Continued)

(56) References Cited

U.S. PATENT DOCUMENTS 2,131,170 A    9/1938  Evans
3,743,367 A    7/1973  Raimondi
(Continued)

FOREIGN PATENT DOCUMENTS

AT    510062 A1    1/2012
CN    102062145 A    5/2011
(Continued)

OTHER PUBLICATIONS

Translation of EP1025938 obtained Oct. 17, 2017.*
(Continued)

*Primary Examiner* — James Pilkington
(74) *Attorney, Agent, or Firm* — Laurence A. Greenberg; Werner H. Stemer; Ralph E. Locher (57) ABSTRACT

A hydrodynamic plain bearing includes a bearing shell having an inner surface which forms a bearing surface for a rotating shaft or the like. The bearing surface has a plurality of surface segments separated from each other and disposed successively in the circumferential direction of the bearing shell. At least the bearing surface or the entire bearing shell is made from CuCr1Zr.

34 Claims, 4 Drawing Sheets

(51) Int. Cl.
*F16C 33/10* (2006.01)
*F16C 33/12* (2006.01)

(52) U.S. Cl.
CPC .......... F16C 33/121 (2013.01); F16C 37/002 (2013.01); *F16C 2202/20* (2013.01); *F16C 2204/10* (2013.01)

(58) Field of Classification Search
CPC .......................... F16C 33/1065; F16C 33/107; F16C 33/1075; F16C 17/22; F16C 17/24; F16C 17/243; F16C 37/002
USPC ........................................ 384/316, 321, 900
See application file for complete search history.

(56) References Cited

U.S. PATENT DOCUMENTS

| | | | | |
|---|---|---|---|---|
| 4,302,060 A | * | 11/1981 | Nicholas | F16C 32/0659 384/111 |
| 4,311,349 A | * | 1/1982 | Roberts | F16C 9/04 384/286 |
| 4,834,559 A | | 5/1989 | Kalvoda | |
| 6,443,354 B1 | | 9/2002 | Plochl et al. | |
| 6,769,808 B2 | | 8/2004 | Shih et al. | |
| 8,783,954 B2 | | 7/2014 | Garnier | |
| 8,851,754 B2 | * | 10/2014 | Dettmar | F16C 17/02 384/114 |
| 2010/0166347 A1 | | 7/2010 | Wendling | |
| 2011/0200422 A1 | | 8/2011 | Gutknecht | |
| 2012/0183245 A1 | | 7/2012 | Dettmar et al. | |

FOREIGN PATENT DOCUMENTS

| | | |
|---|---|---|
| DE | 349786 * | 3/1922 |
| DE | 2013126 A1 | 6/1971 |
| DE | 102011005467 A1 | 9/2012 |
| DE | 102012210530 A1 | 12/2013 |
| EP | 1025938 A1 | 8/2000 |
| GB | 781085 A | 8/1957 |

OTHER PUBLICATIONS

Translation of DE349786 obtained May 3, 2018.*
"CuCr1Zr—Werkstoffdatenblaetter"; Deutsches Kupferinstitut; 2005.

* cited by examiner

HYDRODYNAMIC PLAIN BEARING

BACKGROUND OF THE INVENTION

Field of the Invention

The present invention concerns a hydrodynamic plain bearing with a bearing shell, the inner surface of which forms a bearing surface for a rotating shaft or similar, wherein the bearing surface has a plurality of surface segments separated from each other and arranged successively in the circumferential direction of the bearing shell.

In an advantageous embodiment, such hydrodynamic plain bearings as described in the present invention are configured as multi-wedge bore bearings, in which the inner periphery of each surface segment forms a circle segment with a radius R, wherein the center point of the respective circle segment is shifted by an eccentricity relative to a center point of the bearing shell. Such a shift is also called profiling, which is defined by the difference between radius R and a reference radius r, standardized to the reference radius. The reference radius r is for example the radius of a circle ring theoretically fitted into the bearing surface, or the radius of the outer surface of the shaft rotating in the bearing.

Generic bearings are designed for example as a bearing with a two-wedge bore, also called a segmented bearing, or as a bearing with a three-wedge bore or four-wedge bore.

Conventional bearings have the disadvantage that they are subjected to considerable thermal and mechanical loads in operation, which could lead to a shorter service life.

BRIEF SUMMARY OF THE INVENTION

The present invention is based on the object of specifying a hydrodynamic plain bearing of the type cited initially, for which the loads occurring in operation are reduced and the service life is extended.

The object of the invention is achieved by a hydrodynamic plain bearing with the features described below. The dependent claims specify advantageous and particularly suitable embodiments of the invention.

A hydrodynamic plain bearing according to the invention has a bearing shell, the inner surface of which—as described above—forms a bearing surface for a rotating shaft or similar. Instead of a rotating shaft, for example a journal of another rotating component may be mounted inside the bearing shell. Usually the outer surface of the component supported inside the bearing shell is cylindrical.

According to the invention, the bearing surface has a plurality of surface segments separated from each other and arranged successively in the circumferential direction of the bearing shell. The surface segments may be configured and positioned such that they form a so-called multi-wedge bore bearing, as described above.

According to the invention, now at least the bearing surface or advantageously the entire bearing shell is made from CuCr1Zr.

Due to the material choice according to the invention, in particular combined with the geometric features of the bearing shell yet to be described below, a particularly high heat dissipation can be achieved which leads to a significant reduction in mechanical load on the bearing in operation.

Particularly advantageously, the proportion of Cr is 0.5 to 1.2 w. %, the proportion of Zr is 0.03 to 0.3 w. %, where applicable admixtures of other substances to maximum 0.2 w. % are provided, and Cu forms the remainder of the alloy according to the invention in this exemplary embodiment.

It is favorable if at least the bearing surface or the entire bearing shell is artificially aged, in contrast to a solution-treated material.

According to a particularly advantageous embodiment, at least the bearing surface or the entire bearing shell has a thermal conductivity of at least 300 Watts per meter and Kelvin (W/(m*K)), in particular at a temperature of 250° C. or less.

One embodiment provides that the bearing surface has at least three or precisely three surface segments, in particular with different circumferential angles. For example, a first surface segment is provided which has a circumferential angle of 170° to 190°, in particular 180°, also a second surface segment which has a circumferential angle of 110° to 140°, in particular 130° or 120°, and a third surface segment which has a circumferential angle from 40° to 70°, in particular 50° or 60°.

It is favorable if the two surface segments with comparatively smaller circumferential angle have a greater profiling than the remaining surface segment, wherein the profiling of these two surface segments with comparatively smaller circumferential angle is in particular the same or identical. The concept of profiling is well known to the person skilled in the art and has been defined above.

According to one embodiment, at least one oil groove is provided which extends in the bearing surface in the circumferential direction, and in particular extends only over part of the circumference or only over the periphery of one surface segment or part of the periphery of one surface segment. For example, the at least one oil groove has a width of between 20 and 30% of a width of the bearing surface in the axial direction of the plain bearing.

According to one embodiment, oil grooves of various widths are provided.

It is favorable if a ring channel for oil supply is provided over the outer circumference of the bearing shell and is connected oil-conductively to the bearing surface via radial oil bores. The oil bores may however also be provided without a corresponding ring channel.

It is favorable if the mouth of at least one oil bore or of all oil bores in the bearing surface is surrounded in each case by a lubricant pocket provided as a recess in the bearing surface. For example, the lubricant pocket may be wider in the axial direction of the bearing than the at least one oil groove or all oil grooves. In particular, the at least one lubricant pocket is at least wider than the oil groove which, viewed in the rotation direction of the shaft, is positioned in front of it.

One embodiment which leads to a bearing with a particularly high load-bearing capacity provides that a lubricant pocket which, in the circumferential direction, is positioned in front of the surface segment or at the start of the surface segment with the smallest circumferential angle, is wider in the axial direction of the bearing than all other lubricant pockets, and in particular wider than all oil grooves.

Due to the at least one lubricant groove or other measures, a so-called pressure dam may be formed which protrudes inward from the bearing surface and obstructs the oil flow when the shaft is turned in the rotation direction. Such a pressure dam is provided in particular in the upper bearing shell.

The bearing shell is for example made from two bearing shell halves which are joined together at a parting line. The bearing shell half with the lower load, usually the upper bearing shell half, may for example be profiled more strongly, in particular three to five times more strongly, than the bearing shell half with the heavier load in operation, which is usually positioned at the bottom. The parting line need not however run in a horizontal plane but may also stand obliquely thereto.

According to an advantageous embodiment of the invention, at least one cooling oil bore is provided in the bearing shell which extends at least partially in the axial direction of the bearing shell, i.e. parallel to the rotation axis of the mounted shaft. It may also extend at an angle to the rotary axis, in particular both in the axial direction and in the circumferential direction of the bearing shell, and/or in the axial direction and in the radial direction of the bearing shell, or in all three said directions. Advantageously, a plurality of corresponding cooling oil bores is provided. For example, the at least one cooling oil bore or the plurality of cooling oil bores each runs, starting from the ring channel, over the outer circumference of the bearing shell, first radially or at least partially radially inwards and then in the axial direction or partially in the axial direction. Also, starting from the ring channel, a T-shaped cooling oil bore is possible which runs in two opposing axial directions, for the one or the plurality of cooling oil bores. Particularly advantageously, such a cooling oil bore or a plurality of such cooling oil bores is provided over the circumferential portion of the bearing shell which carries the highest bearing load, for example in the region of the third surface segment described above, or at the transition from the second surface segment to the third surface segment, i.e. at the end of the second surface segment and at the start of the third surface segment.

BRIEF DESCRIPTION OF THE SEVERAL VIEWS OF THE DRAWING

The invention will be described below as an example with reference to an exemplary embodiment and the figures. These show.

DESCRIPTION OF THE INVENTION

Figure 1:
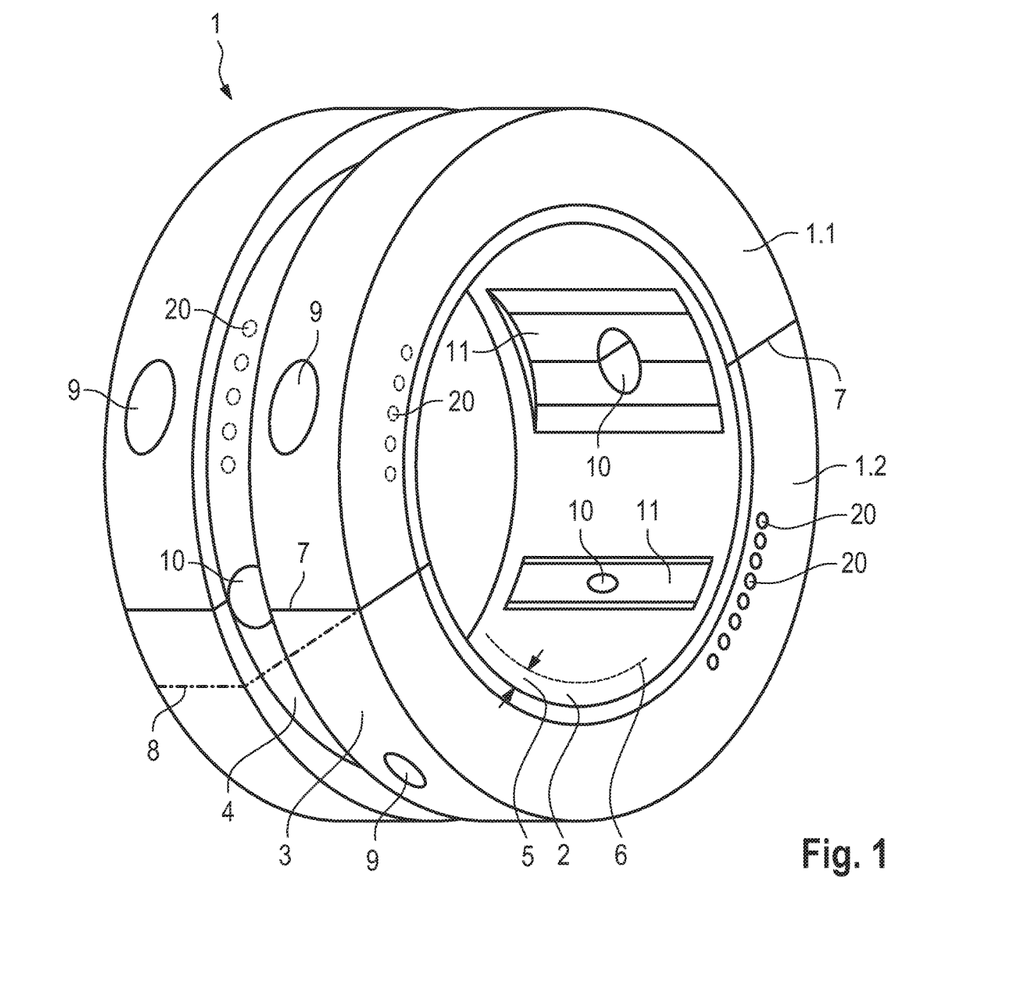
FIG. 1 an exemplary, oblique, top view of a hydrodynamic plain bearing according to the invention.

FIG. 1 shows an exemplary embodiment of a hydrodynamic plain bearing according to the invention, with a bearing shell 1 which forms a bearing surface 2 on its inner periphery and has a substantially cylindrical outer periphery 3 with a ring channel 4 provided therein for supplying lubricating oil and/or cooling oil to the bearing gap 5 which is formed between the bearing surface 2 and the outer circumference of a shaft 6, indicated here merely diagrammatically, which is supported by the hydrodynamic plain bearing.

In the exemplary embodiment shown, the bearing shell 1 consists of two bearing shell halves 1.1, 1.2 which each extend over 180° of the bearing surface 2 or outer periphery 3, and are joined together at a parting line 7 which runs in a parting line plane 8. The two bearing shell halves 1.1, 1.2 are for example bolted together via bolts 9.

In the radial direction of the bearing shell 1, three oil bores 10 are provided which create an oil-conductive connection between the outer periphery 3 and the bearing surface 2. The mouth of each oil bore 10 in the bearing surface 2 is surrounded by a lubricant pocket 11 provided as a recess in the bearing surface 2. The oil bores 10 open into the ring channel 4 on the outer periphery 3.

In the exemplary embodiment shown, a plurality of cooling oil bores 20 is provided in the bearing shell 1, in particular in the region of the highest bearing load, for example where the oil bore 10 of the lower bearing shell half 1.2 is also provided. However, such cooling oil bores 20 are also possible in the other circumferential portions of the bearing shell 1, for example also in the first bearing shell half 1.1. For clarification, cooling oil bores 20 are drawn in dotted lines there, wherein here the start or inlet of the cooling oil bores 20 in the ring channel 4 is also visible. Advantageously, the cooling oil bores 20 open at the face end into the bearing shell 1 or the corresponding bearing shell halves 1.1 and 1.2.

Figure 2:
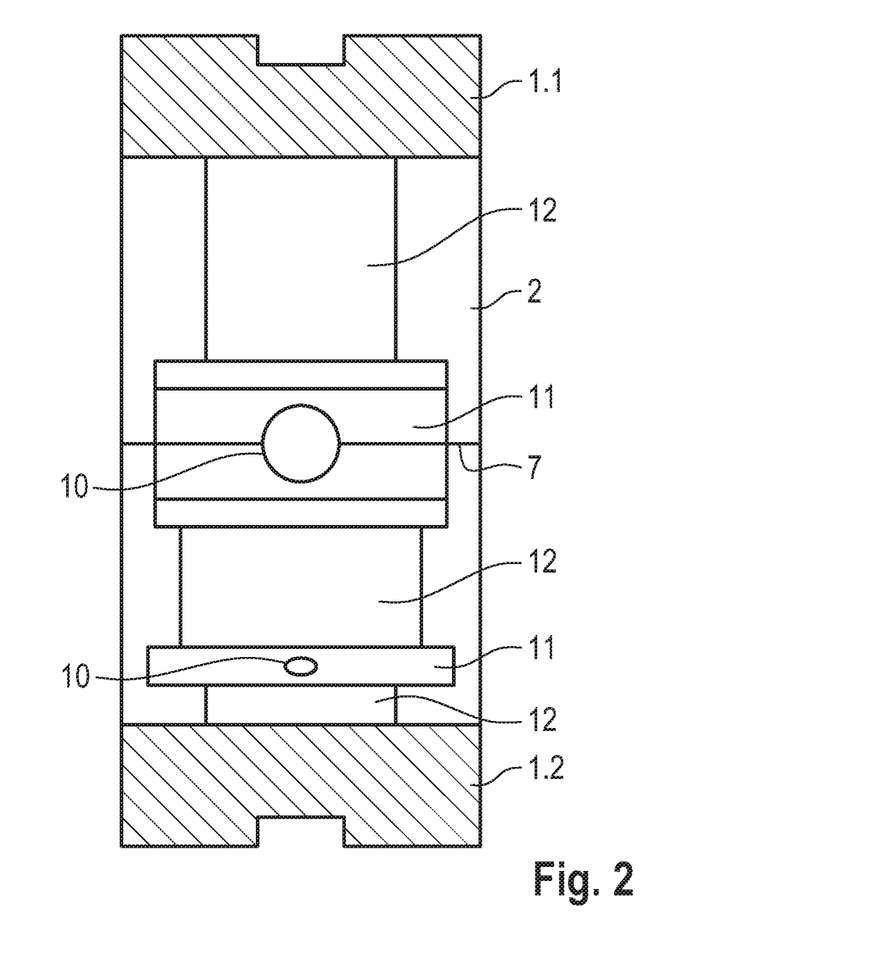
FIG. 2 a schematic, partly cross-section view of the bearing surface of the bearing from FIG. 1.

FIG. 2 shows a top view from the inside onto the bearing surface 2. As well as the lubricant pockets 11 with the oil bores 10 shown in FIG. 1, oil grooves 12 can be seen in the bearing surface 2 which extend in the circumferential direction over part of the width (which corresponds to the axial direction of the bearing). The oil grooves 12 may have different widths relative to each other and/or the lubricant pockets 11. This is not however essential. The oil grooves 12 may also extend starting from a first lubricant pocket 11 up to a second lubricant pocket 11, but this is also not essential. The oil bores 10 may in particular have different diameters, for example the oil bores 10 positioned in the parting line 7 have a greater diameter than the remaining oil bore 10, which however opens in particular into a lubricant pocket 11 with the comparatively largest axial width. In particular the comparatively widest oil groove 12 is provided between this lubricant pocket 11 and the following lubricant pocket 11 in the circumferential direction of rotation of the shaft 6, as shown for example in FIG. 2.

Figure 3:
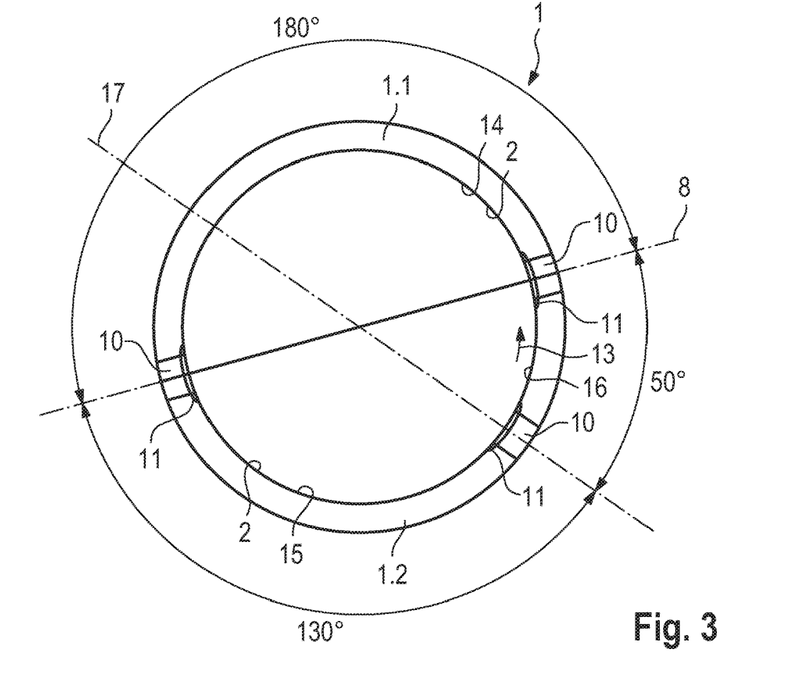
FIG. 3 a schematic depiction of the surface segmenting of the bearing surface of the bearing from FIGS. 1 and 2.

As can be seen from FIG. 3 in connection with FIG. 2, this comparatively widest lubricant pocket 12, viewed for example in the rotation direction of the shaft 6 (FIG. 1) as indicated by arrow 13 in FIG. 3, is positioned in front of or at the start of the smallest surface segment which, in the present case, is designated the third surface segment 16. As shown for example in FIG. 3, this third surface segment 16 has a circumferential angle of 50°. In the direction of rotation 13 of the shaft 6 (shown in FIG. 1), the third surface segment 13 is followed by a first surface segment 14 which in the exemplary embodiment shown extends over a circumferential angle of 180°, and by a second surface segment 15 which in the exemplary embodiment shown extends over a circumferential angle of 130°. The surface segments 14, 15, 16 are each separated from each other over the circumference by radial oil bores 10 which extend from an outer periphery 3 of the bearing shell 1 to the bearing surface 2.

In the exemplary embodiment shown here, the entire first bearing shell half 1.1 is formed on the bearing surface 2 by the first surface segment 14. The bearing surface 2 of the second bearing shell half 1.2 is however formed by the second surface segment 15 and the third surface segment 16.

Figure 4:
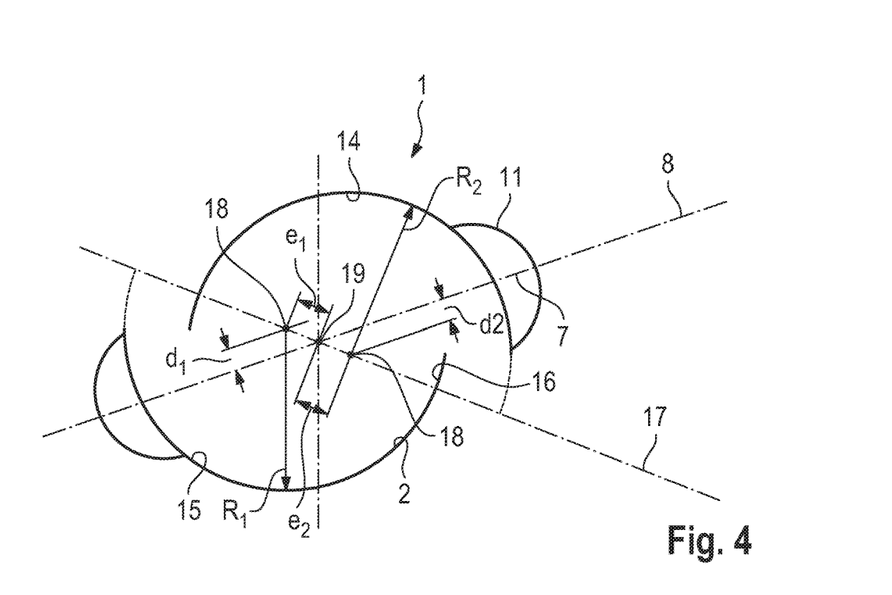
FIG. 4 a significantly enlarged, schematic view of the offset of the surface segments relative to the center point of the bearing shell.

Notably, in the exemplary embodiment shown, an offset plane 17—which will be described in more detail with reference to FIG. 4—is positioned at an angle to the parting line plane 8, in particular angled at 10° or 20° to 60° thereto.

The first bearing shell half 1.1 shown in FIG. 3, which is under the lowest load in operation, is profiled less strongly than the second bearing shell half 1.2, which means that the surface segment radius (radius of the circle segment formed by the surface segment) is significantly larger than the reference radius, which for example is defined by the outer radius of the shaft 6 or by the radius of a circle ring theoretically fitted into the bearing surface 2. For example, the bearing shell half under lower load is profiled three to five times more strongly than the bearing shell half under comparatively higher load.

FIG. 4 shows again the parting line 7 with the parting line plane 8 and the two lubricant pockets 11 (not shown to scale) in the parting line plane 8. The radius R of the surface segments or the circle segment formed thereby on the inside is also shown. The radius of a surface segment or the surface segments 15, 16 is designated $R_1$, the radius of the other surface segment $R_2$. The center point of the respective circle segment (of the two bearing shell halves 1.1, 1.2, see FIG. 3) marked 18 is shifted by an eccentricity d relative to the center point 19 of the bearing shell 1 and hence also relative to the parting line plane 8. Each center point 18 of the circle segments of the surface segment 14, or jointly formed by the second and third surface segments 15, 16, is also shifted by an offset e relative to the center point 19 of the bearing shell 1 within the offset plane 17. Correspondingly to the radii $R_1$, $R_2$, the offset of the surface segments 15, 16 is designated $e_1$ and the offset of surface segment 14 is $e_2$. Also, the eccentricity $d_1$ of the second and third surface segments 15, 16 and the eccentricity $d_2$ of the first surface segment 14 are marked.

Figure 5:
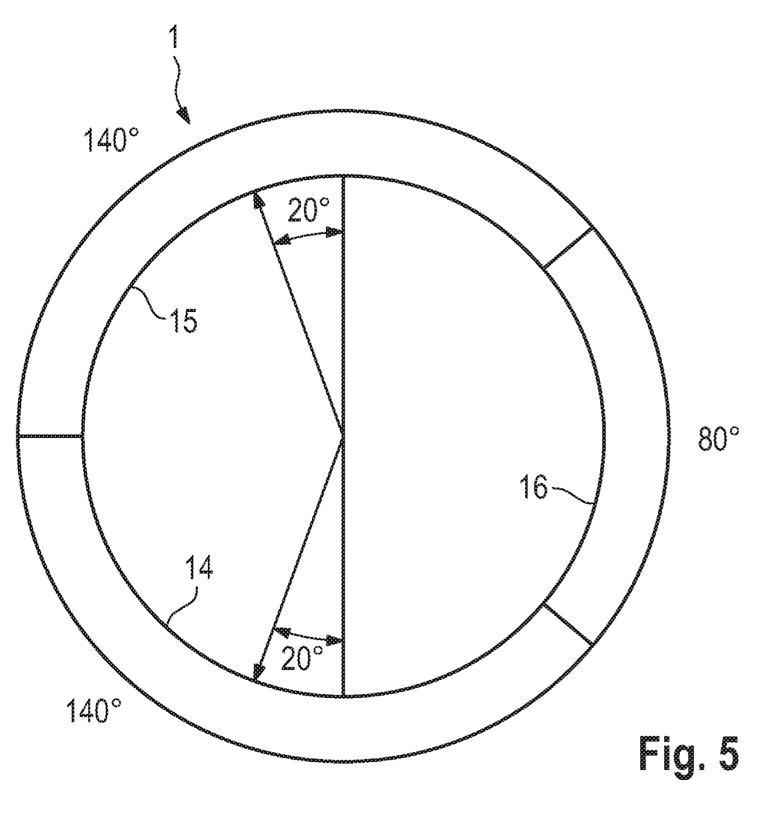
FIG. 5 a further exemplary embodiment of a hydrodynamic plain bearing according to the invention, with a different segment division.

FIG. 5 shows a further exemplary embodiment of a hydrodynamic plain bearing according to the invention in schematic form. In this exemplary embodiment, again three surface segments 14, 15, 16 are provided which are arranged successively in the circumferential direction of the bearing shell 1 and each form a circle segment with their inner periphery, wherein—by deviation from the previous exemplary embodiment—two surface segments 14, 15 each extend over 140° and the remaining surface segment 16 extends over 80°. In particular, the surface segments 14, 15 extending over 140° have a smaller profile than the surface segment 16 extending over 80°. Thus it is possible for the surface segments 14, 15 extending over the greater angle to have a higher load-bearing capacity than the remaining surface segment 16, which however contributes particularly to the stability of the bearing. The bearing is suitable in particular for all operating points, so that no bearing change is required. Optionally, advantageously oil bores or cooling bores may be provided in the surface segments 14, 15 extending over 140°, evidently also or alternatively in the remaining surface segment 16.

In the exemplary embodiment shown, two main load directions are shown which are arranged offset by an angle by 20° from a vertical. However, other main load directions may also be provided. The bearing is in particular equally suitable for both rotation directions, and may for example be provided as a bearing for a spur gear, wherein an intermeshing pinion and/or a gearwheel may be driven.

The parting line is not shown in detail in the exemplary embodiment shown.

The invention claimed is:

1. A hydrodynamic plain bearing, comprising:
a bearing shell having a circumferential direction, an axial direction and an inner surface forming a bearing surface for a rotating shaft or component, said bearing shell having a plurality of cooling bores formed therein running at least partially in said axial direction of said bearing shell;
said bearing surface having a plurality of surface segments being separated from each other and disposed successively in said circumferential direction;
said bearing shell having an upper circumferential portion and a lower circumferential portion, and said plurality of cooling bores being grouped together in less than all of said lower circumferential portion of said bearing shell;
at least said bearing surface or all of said bearing shell being made of CuCr1Zr;
wherein said plurality of surface segments of said bearing surface includes at least three surface segments; and
wherein said at least three surface segments have different circumferential angles.

2. The hydrodynamic plain bearing according to claim 1, which further comprises at least one oil groove extending in said circumferential direction in said bearing surface.

3. The hydrodynamic plain bearing according to claim 2, wherein said at least one oil groove extends only over part of a circumference or only over a periphery of one of said surface segments or only over a part of said periphery of said one surface segment.

4. The hydrodynamic plain bearing according to claim 2, wherein said bearing surface has a width, and said at least one oil groove has a width of between 20 and 30% of said width of said bearing surface in an axial direction of the plain bearing.

5. The hydrodynamic plain bearing according to claim 2, wherein said bearing shell has an outer circumference, and a ring channel for oil supply is provided over said outer circumference of said bearing shell and is oil-conductively connected to said bearing surface through radial oil bores.

6. The hydrodynamic plain bearing according to claim 5, wherein at least one of said oil bores in said bearing surface has a mouth, and at least one lubricant pocket in said bearing surface surrounds said mouth.

7. The hydrodynamic plain bearing according to claim 6, wherein said at least one lubricant pocket is wider in axial direction of the plain bearing than said at least one oil groove.

8. The hydrodynamic plain bearing according to claim 1, wherein said bearing shell has an outer periphery, and said surface segments are located circumferentially between radial oil bores extending from said outer periphery of said bearing shell to said bearing surface.

9. The hydrodynamic plain bearing according to claim 1, wherein at least said bearing surface or all of said bearing shell are artificially aged.

10. The hydrodynamic plain bearing according to claim 1, wherein at least said bearing surface or all of said bearing shell has a thermal conductivity of at least 300 W/(m*k).

11. The hydrodynamic plain bearing according to claim 10, which further comprises at least one oil groove extending in said circumferential direction in said bearing surface.

12. The hydrodynamic plain bearing according to claim 10, which further comprises:
at least one oil groove extending only over part of a circumference or only over a periphery of one of said surface segments or only over a part of said periphery of said one surface segment;
said bearing surface having a width; and
said at least one oil groove having a width of between 20 and 30% of said width of said bearing surface in an axial direction of the plain bearing.

13. A hydrodynamic plain bearing, comprising:
a bearing shell having a circumferential direction, an axial direction and an inner surface forming a bearing surface for a rotating shaft or component, said bearing shell having a plurality of cooling bores formed therein running at least partially in said axial direction of said bearing shell;

said bearing surface having a plurality of surface segments being separated from each other and disposed successively in said circumferential direction;

said bearing shell having an upper circumferential portion and a lower circumferential portion, and said plurality of cooling bores being grouped together in said lower circumferential portion of said bearing shell;

at least said bearing surface or all of said bearing shell being made of CuCr1Zr;

wherein said plurality of surface segments of said bearing surface includes at least three surface segments; and wherein said at least three surface segments include a first surface segment having a circumferential angle of 170° to 190°, a second surface segment having a circumferential angle of 110° to 140°, and a third surface segment having a circumferential angle of 40° to 70°.

14. The hydrodynamic plain bearing according to claim 13, wherein said first surface segment has a circumferential angle of 180°, said second surface segment has a circumferential angle of 130° or 120°, and said third surface segment has a circumferential angle of 50° or 60°.

15. A hydrodynamic plain bearing, comprising:
a bearing shell having a circumferential direction, an axial direction and an inner surface forming a bearing surface for a rotating shaft or component, said bearing shell having a plurality of cooling bores formed therein running at least partially in said axial direction of said bearing shell;

said bearing surface having a plurality of surface segments being separated from each other and disposed successively in said circumferential direction;

said bearing shell having an upper circumferential portion and a lower circumferential portion, and said plurality of cooling bores being grouped together in less than all of said lower circumferential portion of said bearing shell;

at least said bearing surface or all of said bearing shell being made of CuCr1Zr;

wherein said plurality of surface segments of said bearing surface includes at least three surface segments; and wherein said at least three surface segments include two of said surface segments having a comparatively smaller circumferential angle and a greater profiling than a remaining third one of said surface segments.

16. The hydrodynamic plain bearing according to claim 15, wherein said profiling of said two surface segments having said comparatively smaller circumferential angle is the same.

17. A hydrodynamic plain bearing, comprising:
a bearing shell having a circumferential direction, an axial direction and an inner surface forming a bearing surface for a rotating shaft or component, said bearing shell having a plurality of cooling bores formed therein running at least partially in said axial direction of said bearing shell;

said bearing surface having a plurality of surface segments being separated from each other and disposed successively in said circumferential direction;

said bearing shell having an upper circumferential portion and a lower circumferential portion, and said plurality of cooling bores being grouped together in said lower circumferential portion of said bearing shell;

at least said bearing surface or all of said bearing shell being made of CuCr1Zr; and at least one oil groove extending in said circumferential direction in said bearing surface;

wherein:
said bearing shell has an outer circumference, and a ring channel for oil supply is provided over said outer circumference of said bearing shell and is oil-conductively connected to said bearing surface through radial oil bores;

at least one of said oil bores in said bearing surface has a mouth, and at least one lubricant pocket in said bearing surface surrounds said mouth;

said plurality of surface segments have different circumferential angles, one of said surface segments has a smallest circumferential angle and a start;

said at least one lubricant pocket includes a plurality of lubricant pockets; and one of said lubricant pockets is disposed at said start of said surface segment with said smallest circumferential angle and is wider in an axial direction of the plain bearing than all others of said lubricant pockets.

18. A hydrodynamic plain bearing, comprising:
a bearing shell having a circumferential direction, an axial direction and an inner surface forming a bearing surface for a rotating shaft or component, said bearing shell having a plurality of cooling bores formed therein running at least partially in said axial direction of said bearing shell;

said bearing surface having a plurality of surface segments being separated from each other and disposed successively in said circumferential direction;

said bearing shell having an upper circumferential portion and a lower circumferential portion, and said plurality of cooling bores being grouped together in said lower circumferential portion of said bearing shell;

at least said bearing surface or all of said bearing shell being made of CuCr1Zr;

at least said bearing surface or all of said bearing shell has a thermal conductivity of at least 300 W/(m*k); and said plurality of surface segments include a first surface segment having a circumferential angle of 170° to 190°, a second surface segment having a circumferential angle of 110° to 140°, and a third surface segment having a circumferential angle of 40° to 70°.

19. The hydrodynamic plain bearing according to claim 18, wherein said CuCr1Zr includes a proportion of 0.5 to 1.2% by weight of Cr, a proportion of 0.03 to 0.3% by weight of Zr, admixtures of a maximum of 0.2% by weight of other substances and a remainder of Cu.

20. The hydrodynamic plain bearing according to claim 18, wherein said first surface segment has a circumferential angle of 180°, said second surface segment has a circumferential angle of 130° or 120°, and said third surface segment has a circumferential angle of 50° or 60°.

21. The hydrodynamic plain bearing according to claim 18, which further comprises at least one oil groove extending in said circumferential direction in said bearing surface.

22. The hydrodynamic plain bearing according to claim 21, wherein said at least one oil groove extends only over part of a circumference or only over a periphery of one of said surface segments or only over a part of said periphery of said one surface segment.

23. A hydrodynamic plain bearing, comprising:
a bearing shell having a circumferential direction, an axial direction and an inner surface forming a bearing surface for a rotating shaft or component and an outer periphery, said bearing shell having a plurality of cooling bores formed therein running at least partially in said axial direction of said bearing shell;

said bearing surface having a plurality of surface segments being separated from each other and disposed successively in said circumferential direction, said surface segments located circumferentially between radial oil bores extending from said outer periphery of said bearing shell to said bearing surface;

said bearing shell having a lower circumferential portion and an upper circumferential portion, and said plurality of cooling bores being grouped together in a region of said lower circumferential portion, said region being adjacent to a radial oil bore between two surface segments in said lower circumferential portion; and at least said bearing surface or all of said bearing shell being made of CuCr1Zr.

24. The hydrodynamic plain bearing according to claim 23, wherein said CuCr1Zr includes a proportion of 0.5 to 1.2% by weight of Cr, a proportion of 0.03 to 0.3% by weight of Zr and a remainder of Cu.

25. The hydrodynamic plain bearing according to claim 23, wherein said CuCr1Zr includes a proportion of 0.5 to 1.2% by weight of Cr, a proportion of 0.03 to 0.3% by weight of Zr, admixtures of a maximum of 0.2% by weight of other substances and a remainder of Cu.

26. The hydrodynamic plain bearing according to claim 23, wherein at least said bearing surface or all of said bearing shell are artificially aged.

27. The hydrodynamic plain bearing according to claim 23, wherein at least said bearing surface or all of said bearing shell has a thermal conductivity of at least 300 W/(m*k).

28. The hydrodynamic plain bearing according to claim 23, wherein at least said bearing surface or all of said bearing shell has a thermal conductivity of at least 300 W/(m*k) at 250° C. or less.

29. A hydrodynamic plain bearing, comprising:

a bearing shell having a circumferential direction, a center point, an axial direction and an inner surface forming a bearing surface for a rotating shaft or component, said bearing shell having a plurality of cooling bores formed therein running at least partially in said axial direction of said bearing shell;

said bearing surface having a plurality of surface segments being separated from each other and disposed successively in said circumferential direction, an inner periphery of each surface segment of said plurality forming a circle segment with a radius, wherein a center point of each respective circle segment is shifted by an eccentricity relative to the center point of said bearing shell;

said bearing shell having a circumferential portion including at least a first surface segment and another circumferential portion including a second surface segment, the another circumferential portion having an eccentricity of said second surface segment relative to the center point of the bearing shell that is greater than an eccentricity of said at least a first surface segment relative to the center point of the bearing shell, and said plurality of cooling bores being grouped together in said circumferential portion including said at least a first surface segment; and at least said bearing surface or all of said bearing shell being made of CuCr1Zr.

30. The hydrodynamic plain bearing according to claim 29, wherein said CuCr1Zr includes a proportion of 0.5 to 1.2% by weight of Cr, a proportion of 0.03 to 0.3% by weight of Zr and a remainder of Cu.

31. The hydrodynamic plain bearing according to claim 29, wherein said CuCr1Zr includes a proportion of 0.5 to 1.2% by weight of Cr, a proportion of 0.03 to 0.3% by weight of Zr, admixtures of a maximum of 0.2% by weight of other substances and a remainder of Cu.

32. The hydrodynamic plain bearing according to claim 29, wherein at least said bearing surface or all of said bearing shell are artificially aged.

33. The hydrodynamic plain bearing according to claim 29, wherein at least said bearing surface or all of said bearing shell has a thermal conductivity of at least 300 W/(m*k).

34. The hydrodynamic plain bearing according to claim 29, wherein at least said bearing surface or all of said bearing shell has a thermal conductivity of at least 300 W/(m*k) at 250° C. or less.

* * * * *